(12) United States Patent
Klinstein et al.

(10) Patent No.: US 9,849,627 B2
(45) Date of Patent: *Dec. 26, 2017

(54) ULTRASONIC PRESS USING SERVO MOTOR WITH DELAYED MOTION

(71) Applicant: Dukane Corporation, St. Charles, IL (US)

(72) Inventors: Leo Klinstein, Glenview, IL (US); Paul Golko, Cyrstal Lake, IL (US); William E. Jurkowski, Wheaton, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/209,273

(22) Filed: Mar. 13, 2014

(65) Prior Publication Data

US 2014/0182769 A1    Jul. 3, 2014

Related U.S. Application Data

(63) Continuation of application No. 13/245,021, filed on Sep. 26, 2011, now Pat. No. 8,720,516, which is a
(Continued)

(51) Int. Cl.
*B29C 65/08* (2006.01)
*B29C 65/00* (2006.01)
*B29K 101/12* (2006.01)

(52) U.S. Cl.
CPC .......... *B29C 65/08* (2013.01); *B29C 66/1122* (2013.01); *B29C 66/30223* (2013.01);
(Continued)

(58) Field of Classification Search
CPC ..... B29C 65/08; B29C 66/944; B29C 66/951; B29C 66/9511; B29C 66/9512;
(Continued)

(56) References Cited

U.S. PATENT DOCUMENTS

| 4,179,059 A | 12/1979 | Chang et al. ................ 228/103 |
| 4,340,166 A | 7/1982 | Bilane et al. ................ 228/179 |

(Continued)

FOREIGN PATENT DOCUMENTS

| DE | 4120245 | 1/1992 | ............ B29C 65/08 |
| DE | 4026711 | 2/1992 | ............... B23Q 5/28 |

(Continued)

OTHER PUBLICATIONS

Veröffentlichung des Zentralverbandes der Elektrotechnik—und Elektronikindustrie e.V. (ZVEI): Fügen von Formteilen und Halbzeugen aus thermoplastischen Kunststoffen mit Ultraschall, 1985, Fachverband Elektroschweißen, Frankfurt, DEXP00205090212405 (56 pages).

(Continued)

*Primary Examiner* — George Koch
(74) *Attorney, Agent, or Firm* — Nixon Peabody LLP

(57) ABSTRACT

An ultrasonic welding system includes an ultrasonic welding stack that is movable to initiated a welding operation. A plurality of sensors measure respective control variables and output control signals corresponding, respectively, to the control variables. A motion control system is coupled to and causes controlled movement of the welding stack, including initiating the welding operation. The motion control system determines, based on the control signals, control inputs such that any motion of the welding stack, subsequent to the initiating, is initially delayed until the control signals satisfy a predetermined condition. In response to the predetermined condition being satisfied, the motion control system causes the welding stack to move in accordance with a weld profile.

16 Claims, 11 Drawing Sheets

Related U.S. Application Data continuation of application No. 12/418,093, filed on Apr. 3, 2009, now Pat. No. 8,052,816, and a continuation-in-part of application No. 11/800,562, filed on May 7, 2007, now Pat. No. 7,819,158.

(60) Provisional application No. 61/042,574, filed on Apr. 4, 2008, provisional application No. 60/798,641, filed on May 8, 2006.

(52) U.S. Cl.
CPC ........ *B29C 66/45* (2013.01); *B29C 66/73921* (2013.01); *B29C 66/80* (2013.01); *B29C 66/8167* (2013.01); *B29C 66/8246* (2013.01); *B29C 66/8322* (2013.01); *B29C 66/847* (2013.01); *B29C 66/9231* (2013.01); *B29C 66/92211* (2013.01); *B29C 66/92431* (2013.01); *B29C 66/92443* (2013.01); *B29C 66/92445* (2013.01); *B29C 66/92611* (2013.01); *B29C 66/92921* (2013.01); *B29C 66/934* (2013.01); *B29C 66/9511* (2013.01); *B29C 66/9512* (2013.01); *B29C 66/9516* (2013.01); *B29C 66/961* (2013.01); *B29C 66/71* (2013.01); *B29C 66/8122* (2013.01); *B29C 66/8224* (2013.01); *B29C 66/932* (2013.01); *B29C 66/93441* (2013.01); *B29C 66/9513* (2013.01); *B29C 66/9517* (2013.01); *B29C 66/9592* (2013.01); *B29K 2101/12* (2013.01); *B29K 2905/02* (2013.01)

(58) Field of Classification Search
CPC ........... B29C 66/9513; B29C 66/9515; B29C 66/9516; B29C 66/9517; B29C 66/93431; B29C 66/9231; B29C 66/8246; B29C 66/8122; B29C 66/73921; B29C 66/45; B29C 66/41
USPC ....... 156/64, 73.1, 73.4, 358, 360, 366, 367, 156/378, 580.1; 228/1.1, 110.1, 111
See application file for complete search history.

(56) References Cited

U.S. PATENT DOCUMENTS

| | | | |
|---|---|---|---|
| 4,496,095 A | 1/1985 | Renshaw et al. ............. 228/102 | |
| 5,110,381 A | 5/1992 | Heckard et al. .............. 156/64 | |
| 5,197,371 A | 3/1993 | Van der Heijden | |
| 5,295,700 A | 3/1994 | Crews et al. .................... 279/5 | |
| 5,397,408 A | 3/1995 | Guzik | |
| 5,491,372 A | 2/1996 | Erhart ............................ 310/80 | |
| 5,557,154 A | 9/1996 | Erhart ............................ 310/80 | |
| 5,706,627 A | 1/1998 | Kirka et al. ..................... 53/52 | |
| 5,707,414 A | 1/1998 | Leidy ............................ 65/158 | |
| 5,788,791 A | 8/1998 | Grewell ....................... 156/73.1 | |
| 5,798,599 A | 8/1998 | Harwood ...................... 310/323 | |
| 5,829,115 A | 11/1998 | Speller, Jr. et al. ........ 29/525.06 | |
| 5,880,580 A | 3/1999 | Johansen ...................... 323/282 | |
| 5,985,064 A | 11/1999 | Sato | |
| 6,036,796 A | 3/2000 | Halbert et al. | |
| 6,118,095 A | 9/2000 | Nagano .......................... 219/110 | |
| 6,152,350 A * | 11/2000 | Hayashi et al. .............. 228/102 | |
| 6,190,296 B1 | 2/2001 | Gnad et al. | |
| 6,289,736 B1 | 9/2001 | Statnikov | |
| 6,450,393 B1 | 9/2002 | Doumanidis et al. ...... 228/110.1 | |
| 6,491,785 B1 | 12/2002 | Sato et al. .................. 156/379.6 | |
| 6,787,729 B2 | 9/2004 | Dugas et al. ............... 219/86.32 | |
| 6,828,522 B2 | 12/2004 | Hochhalter et al. ........ 219/86.32 | |
| 6,891,183 B2 | 5/2005 | Kitamura et al. ........ 250/559.29 | |
| 6,951,052 B2 | 10/2005 | Clew .......................... 29/525.06 | |
| 6,965,091 B2 | 11/2005 | Terada et al. .............. 219/121.6 | |
| 6,984,921 B1 | 1/2006 | Kosterman .............. 310/323.19 | |
| 7,002,095 B2 | 2/2006 | Kato et al. ................. 219/86.41 | |
| 7,141,752 B2 | 11/2006 | Hochhalter et al. ........ 219/86.25 | |
| 7,819,158 B2 | 10/2010 | Klinstein et al. ............. 156/358 | |
| 2002/0038792 A1 | 4/2002 | Terada et al. .............. 219/121.6 | |
| 2003/0136523 A1* | 7/2003 | Takahashi .............. B23K 20/10 156/580.1 | |
| 2004/0069750 A1 | 4/2004 | Kato et al. .................... 219/86.1 | |
| 2004/0241267 A1 | 12/2004 | Schultz ........................ 425/193 | |
| 2005/0077855 A1 | 4/2005 | Hochhalter et al. .......... 318/567 | |
| 2005/0194491 A1* | 9/2005 | Hatano ...................... 242/608.8 | |
| 2005/0241143 A1* | 11/2005 | Mizuno et al. .................. 29/739 | |
| 2005/0284559 A1* | 12/2005 | Ripplinger et al. .......... 156/73.5 | |
| 2007/0068991 A1 | 3/2007 | Handel et al. | |
| 2007/0257087 A1 | 11/2007 | Klinstein et al. ............. 228/101 | |
| 2009/0188966 A1 | 7/2009 | Klinstein | |
| 2017/0129162 A1* | 5/2017 | Klinstein ................ B29C 65/08 | |

FOREIGN PATENT DOCUMENTS

| | | | |
|---|---|---|---|
| DE | 4317621 | 6/1994 | ............ B23K 20/10 |
| DE | 4321874 | 1/1995 | ............ B23K 20/10 |
| DE | 19753740 C1 | 7/1999 | |
| DE | 69528314 T2 | 9/2002 | |
| DE | 10354526 | 6/2005 | ............ B23K 20/12 |
| DE | 102006054760 | 5/2008 | |
| EP | 0421019 | 4/1991 | ............ B29C 65/00 |
| EP | 0421018 | 3/1994 | |
| JP | H03-183527 | 1/1993 | |
| JP | H10128552 | 5/1998 | |
| JP | 2006-231698 | 9/2006 | ............ B29C 65/08 |

OTHER PUBLICATIONS

Titel: Zeitgeäße Kunststoff-Verbindungstechnik . . . : für Thermoplaste; konstruktive u. techn. Arbeitshilfen; substituierende u. alternaive Fügetechnik, Verlag: Limeshain: Groeble, infotip, Erscheinungsjahr 1986, 304 Seiten, ISBN 3-88736-005-2 (64 pages).

Michaeli W et al.: "Bessere Nahtqualitaet Beim Ultraschallschweissen. \Better Weld Quality In Ultrasonic Welding", Kunststoffe, Carl Hanser Verlag, Munchen, DE, vol. 83, No. 9, Sep. 1, 1993 (pp. 667-670).

Fachbuchreihe Schweißtechnik Band 151, Title: Ultraschallfügen und—trennen, Prof. Dr.-Ing. habil. Johannes Wodara, Magdeburg, ISBN 3-87155-212-7, DVS-Verlag GmbH, Düsseldorf, 2004 (9 pages).

"Ultrasonic Metal Bonding System Bonding Process." ULTEX: Ultrasonic Laboratory. Sep. 7, 2005 (1 page).

European Search Report dated Aug. 5, 2010 which issued in European Application No. EP 09005008.9 (11 pages).

International Search Report dated Feb. 28, 2008 which issued in related International Patent Application No. PCT/US2007/011011 (5 pages).

Extended European Search Report for Application No. EP 15180842.5, dated Apr. 18, 2016 (11 pages).

* cited by examiner

ULTRASONIC PRESS USING SERVO MOTOR WITH DELAYED MOTION

CROSS-REFERENCE TO RELATED APPLICATIONS

This application is a continuation of U.S. patent application Ser. No. 13/245,021, filed Sep. 26, 2011, now allowed, which is a continuation of U.S. patent application Ser. No. 12/418,093, filed Apr. 3, 2009, now issued as U.S. Pat. No. 8,052,816, which claims the benefit of and priority from U.S. Provisional Patent Application No. 61/042,574, filed Apr. 4, 2008, and is a continuation-in-part of U.S. patent application Ser. No. 11/800,562, filed May 7, 2007, now issued as U.S. Pat. No. 7,819,158, which claims the benefit of and priority from U.S. Provisional Patent Application No. 60/798,641, filed May 8, 2006, each of which is incorporated herein in its entirety.

FIELD OF THE INVENTION

The present invention relates generally to presses for use in ultrasonic welding or other systems for vibratory joining of plastic parts.

SUMMARY OF THE INVENTION

In accordance with one embodiment of the present concepts, an ultrasonic welding system comprises an ultrasonic welding stack mounted for linear movement and applying a controlled force, speed, or a combination of force and speed to a first workpiece to urge the first workpiece against a second workpiece to which the first workpiece is to be joined. An electrically powered linear actuator is provided and comprises a movable element coupled to the ultrasonic welding stack, the electrically powered linear actuator being configured, responsive to control inputs, to move the movable element and the ultrasonic welding stack with a controlled force, speed, or force and speed, the electrically powered linear actuator including an electrical servo motor producing rotational mechanical motion and an integrated converter configured to convert the rotational motion into linear motion of the electrically powered linear actuator movable element. A controller is configured to provide control inputs to at least one of the electrically powered linear actuator or the servo motor to control an output of the electrically powered linear actuator and at least one sensor is configured to measure at least one corresponding control variable and to output a signal corresponding to the control variable to the controller. In accord with aspects of the present concepts, the controller is configured, based on the signal output by the at least one sensor, to cause the electrically powered linear actuator movable element to apply through the ultrasonic welding stack a predetermined positive initial force at an initiation of a welding operation and to limit a linear displacement of the ultrasonic welding stack to a predetermined initial displacement until the signal output from the at least one sensor indicates that a sensed variable satisfies a predetermined condition. The controller is further configured, based on the signal output by the at least one sensor indicating that the predetermined condition has been satisfied, to cause the electrically powered linear actuator to move the ultrasonic welding stack in accord with a default weld profile or a weld profile selected from a plurality of available weld profiles.

In another aspect of the present concepts, an ultrasonic welding method includes the acts of pressing an ultrasonic welding stack mounted for linear movement against a first workpiece using an electrical servo motor, applying a predetermined initial load to the first workpiece, and initiating a weld, the initiating of the weld comprising outputting energy from the ultrasonic welding stack to the first workpiece. The method further includes sensing, with at least one sensor, a control variable, outputting a signal corresponding to the sensed control variable to a controller, simultaneously outputting energy from the ultrasonic welding stack to the first workpiece and maintaining a weld distance at or near zero until the signal corresponding to the sensed control variable satisfies a predetermined condition, and applying a controlled force, speed, or a combination of force and speed to said first workpiece with an electrically powered linear actuator to urge said first workpiece against a second workpiece to which said first workpiece is to be joined following satisfaction of said predetermined condition.

BRIEF DESCRIPTION OF THE DRAWINGS

The invention will be better understood from the following description of preferred embodiments together with reference to the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
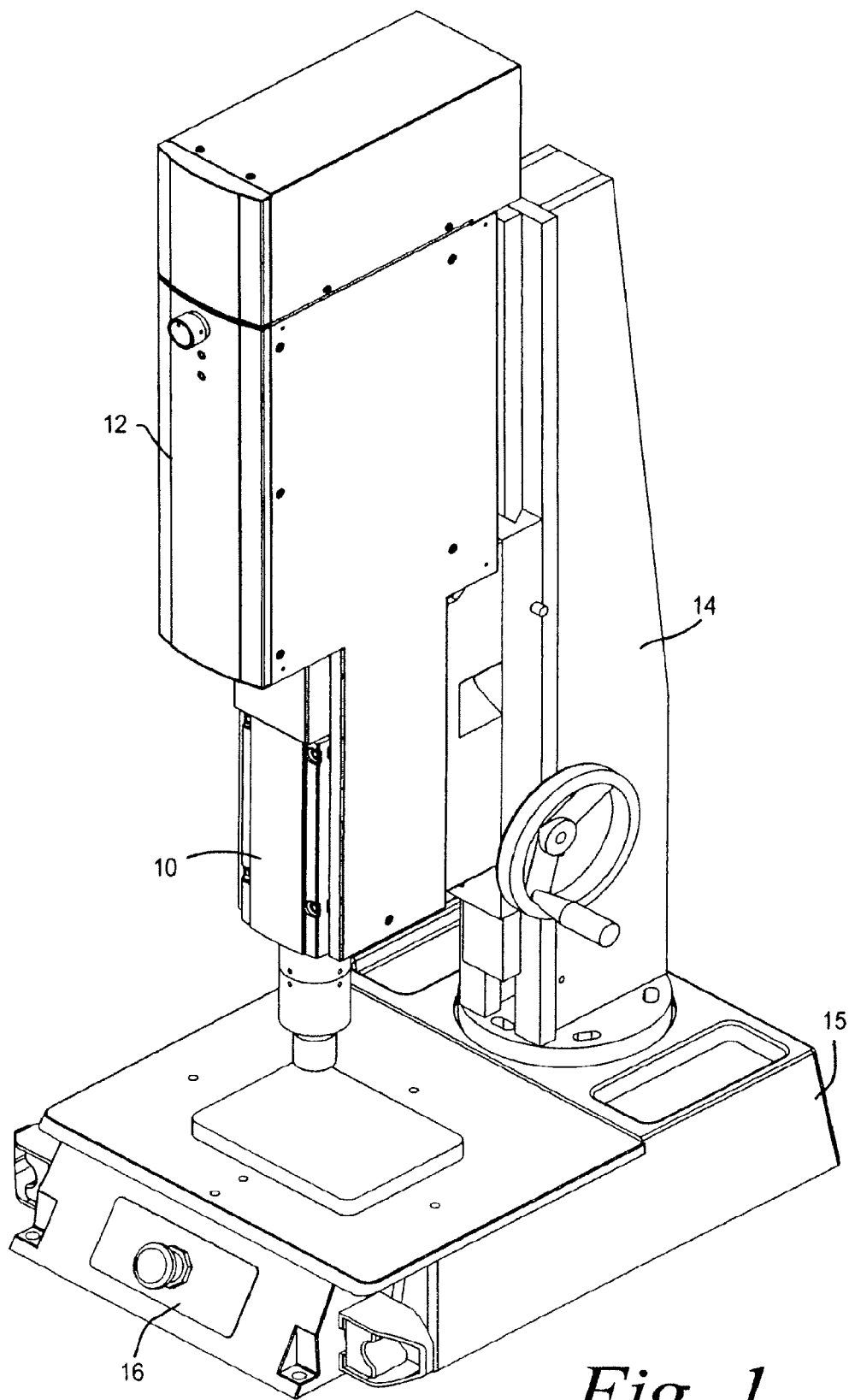
FIG. 1 is a front perspective view of an ultrasonic welding machine.
Figure 2:
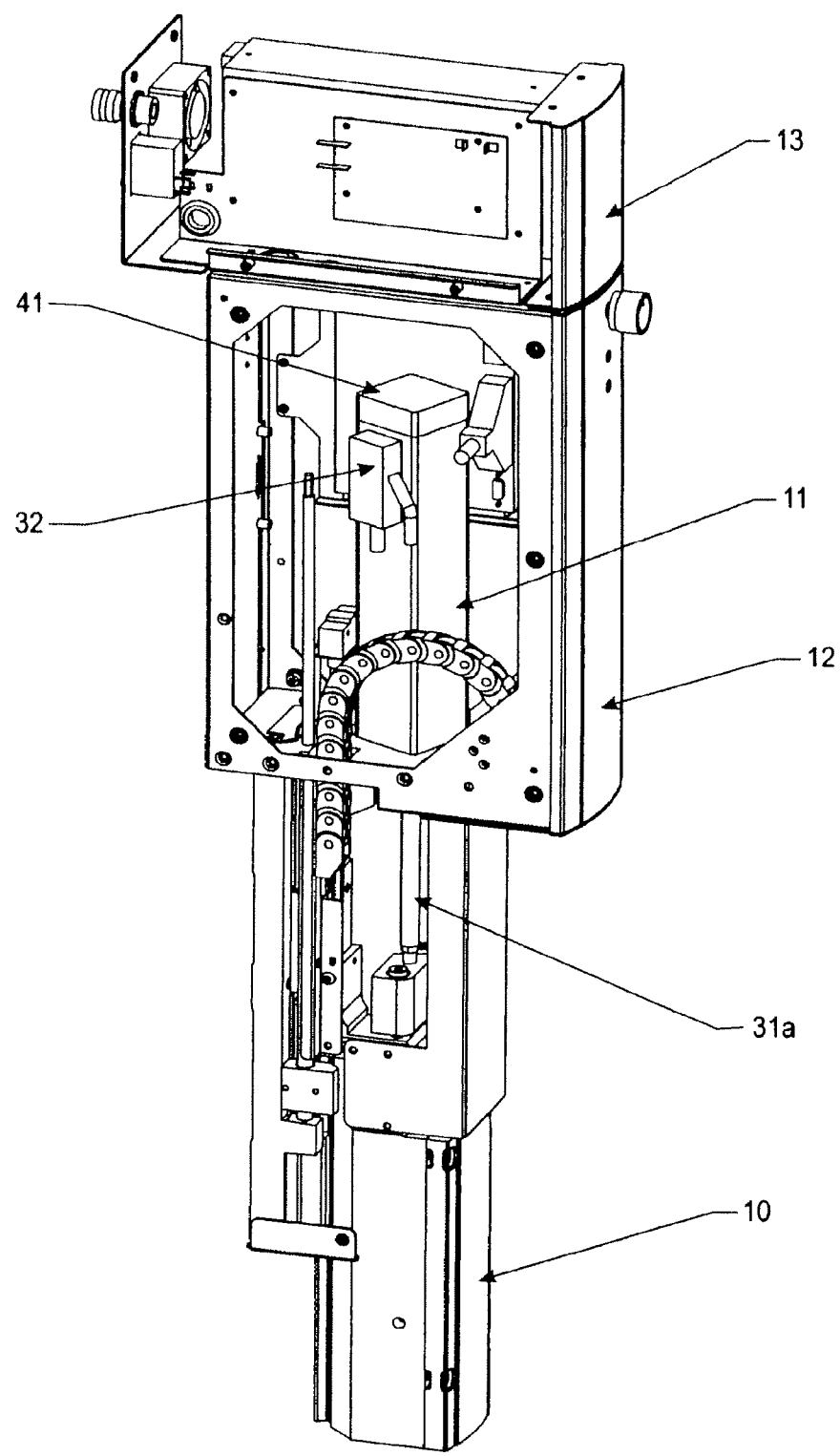
FIG. 2 is an enlarged side perspective of a portion of the ultrasonic welding machine shown in FIG. 1, with portions of the housing walls broken away to reveal the internal structure, including the linear actuator.

Turning now to the drawings and referring first to FIGS. 1-6, the illustrative ultrasonic welding machine includes an ultrasonic welding "stack" 10 that is mounted for controlled vertical movement by a bidirectional, electrically powered linear actuator 11 (FIG. 2). The stack 10 will be described in more detail below in connection with FIGS. 5 and 6. The actuator 11 is mounted within a main housing 12, which also supports an auxiliary housing 13 that contains the power supply and electronic controls for the welding press. In a variation of this concept, the housing 12 and auxiliary housing 13 may be combined into one structure without materially affecting the intent of this invention. The thermoplastic workpieces W1 and W2 (FIG. 5) to be welded are mounted in a stationary fixture below the ultrasonic stack 10, and the actuator 11 advances the stack 10 downwardly against the upper workpiece W1. The lower end of the stack 10 is pressed downwardly against the workpiece W1 to press the upper workpiece W1 against the lower workpiece W2 while applying mechanical vibrations to the workpiece W1 to effect the desired welding that joins the two workpieces W1 and W2 together.

The main housing 12 is mounted on a frame that includes a vertical column 14 extending upwardly from a base 15 that carries a fixture for receiving and supporting the workpieces to be welded. The housing 12 is typically adjustably mounted on the column 14 to allow the vertical position of the entire housing 12 to be adjusted for different workpieces. A control panel 16 is provided on the front of the base 15.

The ultrasonic welding stack 10 includes the following three components (see FIGS. 5 and 6):

1. An electromechanical transducer 20 which converts electrical energy into mechanical vibrations.

2. A booster 21 to alter the gain (i.e., the output amplitude) of the mechanical vibrations produced by the transducer 20.

3. A horn 22 to transfer the mechanical vibrations from the booster 21 to the parts to be welded.

Figure 5:
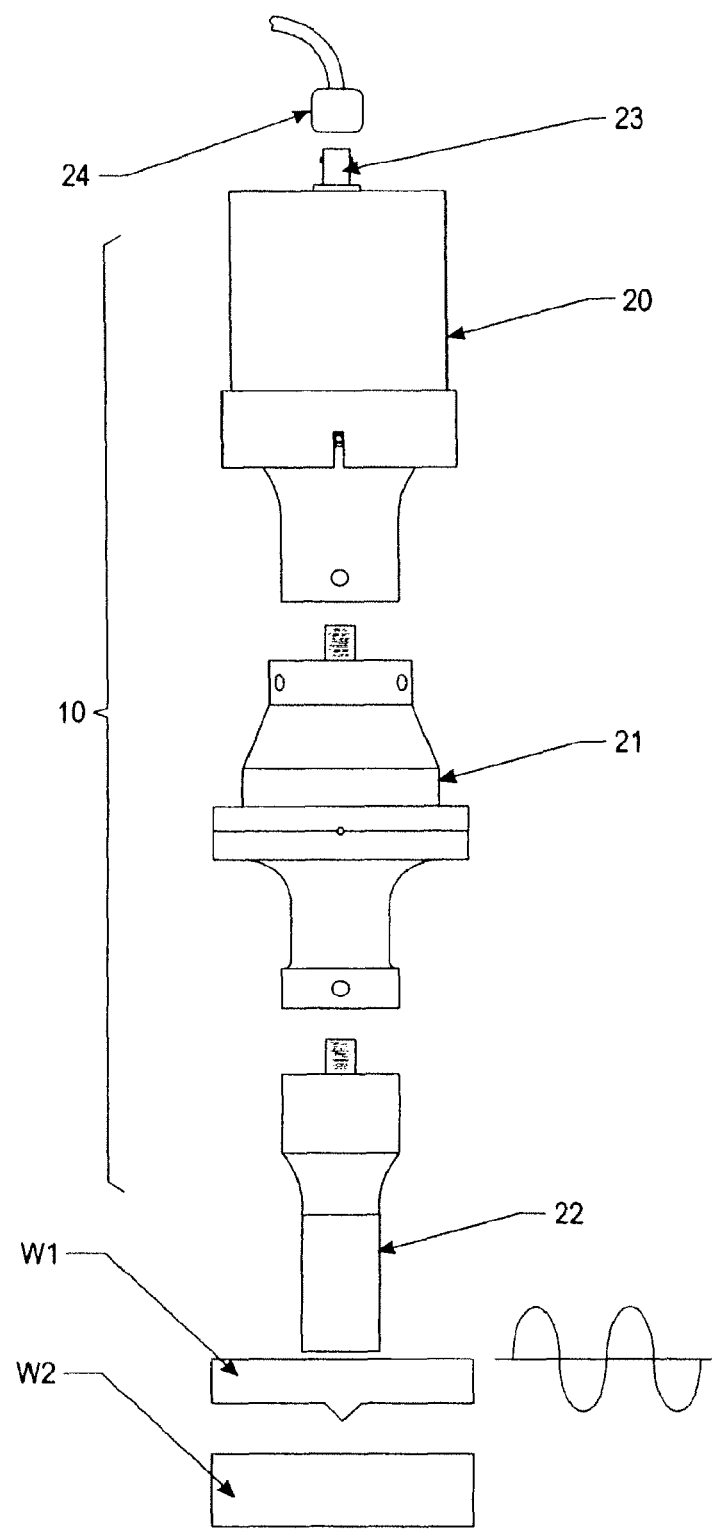
FIG. 5 is an enlarged, exploded elevation of the ultrasonic "stack" in the ultrasonic welding machine shown in FIG. 1.
Figure 6:
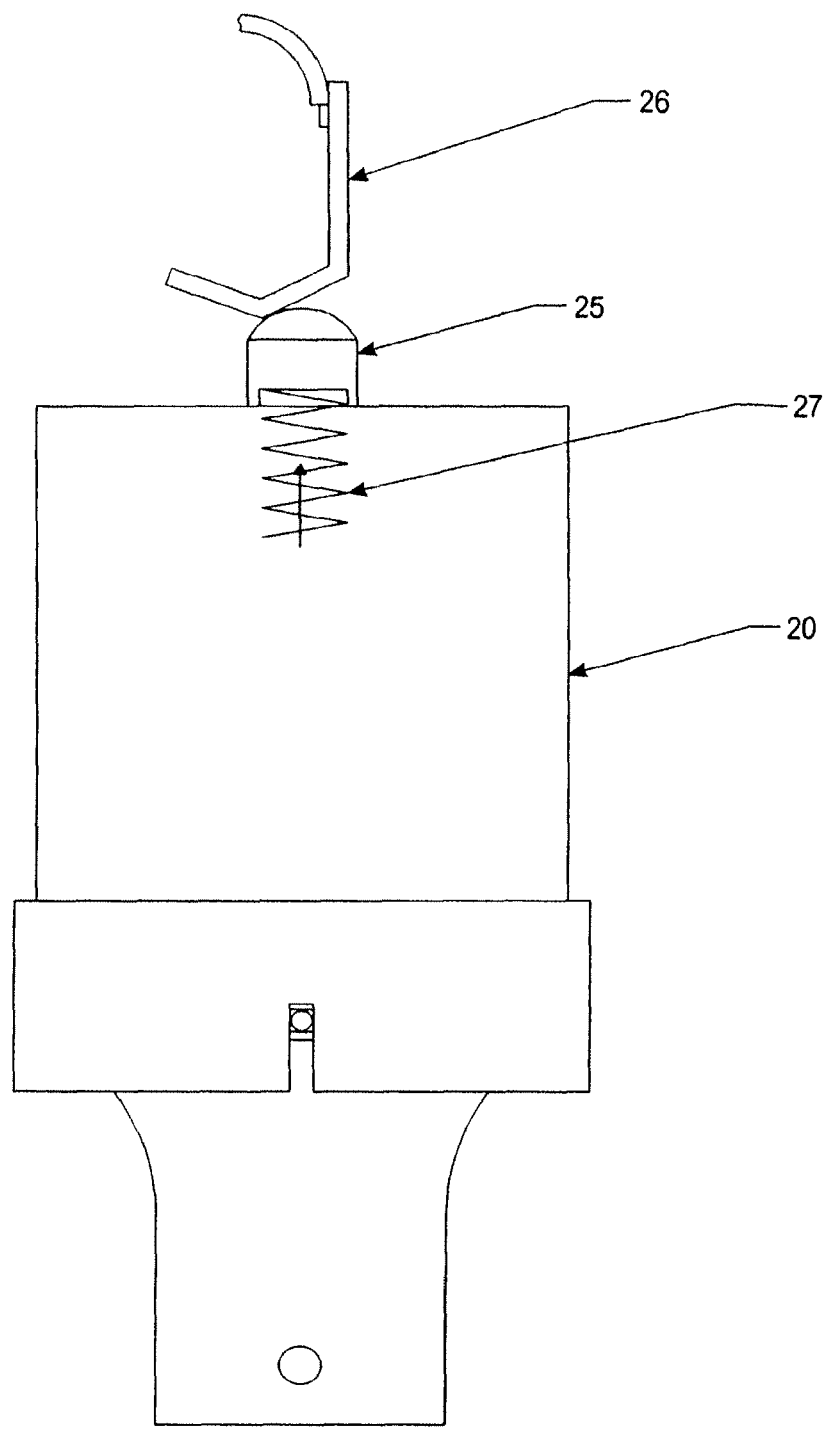
FIG. 6 is a variation of FIG. 5 showing a spring-loaded contact button which remains pressed against a contact bar.

As shown in FIG. 5, the transducer 20 includes a connector 23 for attaching a high voltage coaxial cable 24 that delivers a high-frequency electrical signal for exciting the transducer 20. This signal is supplied by a separate ultrasonic signal generator (not shown). An alternative method of connection can also be utilized to permit easier removal and installation of the transducer. This method as shown in FIG. 6 utilizes a spring mounted button on the transducer 20 which contacts a conductive bar on the press. Electrical conductivity is insured by the spring force behind the button as it presses against the bar.

The transducer 20 generates the ultrasonic vibrations as a Langevin piezoelectric converter that transforms electrical energy into mechanical movement. Power applied to the transducer 20 can range from less than 50 Watts up to 5000 Watts at a typical frequency of 20 kHz. Note that the same concepts will hold true for transducers of other frequencies and power levels which are regularly used in the welding processes of this invention.

The transducer 20 is typically made from a number of standard piezoelectric ceramic elements separated by thin metal plates, clamped together under high pressure. When an alternating voltage is applied to the ceramic elements, a corresponding electric field is produced which results in a variation in thickness of the ceramic elements. This variation in thickness induces a pressure wave that propagates through the material and is reflected by the ends of the metal mass of the transducer. When the length of the assembly is tuned to its frequency of excitation, the assembly resonates and becomes a source of standing waves. The output amplitude from a 20-kHz transducer is typically about 20 microns (0.0008 inches). This amplitude needs to be amplified by the booster 21 and the horn 22 to do useful work on the parts W1 and W2. The booster and horn act as an acoustic waveguide or transformer to amplify and focus the ultrasonic vibrations to the workpiece.

The primary function of the booster 21 is to alter the gain (i.e., output amplitude) of the stack 10. A booster is amplifying if its gain is greater than one and reducing if its gain is less than one. Gains at 20-kHz typically range from less than one-half to about three.

The horn 22 cannot normally be clamped because it must be free to vibrate and thus only the transducer 20 and the booster 21 are secured. Thus, a secondary function (and sometimes the sole purpose) of the booster is to provide an additional mounting location without altering the amplification of the stack when secured in a press. The neutral or coupling booster is added between the transducer and horn and mounted in the press by a mounting ring which is placed at the nodal point (where the standing wave has minimal longitudinal amplitude).

The horn 22 has three primary functions, namely:

1. It transfers the ultrasonic mechanical vibrational energy (originating at the transducer 20) to the thermoplastic workpiece (W1 and W2) through direct physical contact, and localizes the energy in the area where the melt is to occur.

2. It amplifies the vibrational amplitude to provide the desired tip amplitude for the thermoplastic workpiece and welding process requirements.

3. It applies the pressure necessary to force the weld when the joint surfaces are melted.

The horn is precision machined and is typically designed to vibrate at either 15 kHz, 20 kHz, 30 kHz, 40 kHz, 50 kHz or 70 kHz. The higher the frequency, the shorter the acoustic wavelength, and consequently the smaller the horn. The tuning of a horn is typically accomplished using electronic frequency measurement. Horns are usually manufactured from high-strength aluminum alloys or titanium, both of which have excellent acoustical properties to transmit the ultrasonic energy with little attenuation.

There are many different horn shapes and styles depending on the process requirements. Factors which influence the horn design are the materials to be welded and the method of assembly. The horn must amplify the mechanical vibration so that the amplitude is sufficient to melt the thermoplastic workpieces at their interface, and the gain of the horn is determined by its profile. The amplitude at the tip of the horn typically ranges from 30 to 125 microns peak to peak (1.2 to 5.0 thousandths of an inch) at 20 kHz. In an alternate variation, the horn can be designed so that it takes the form of a booster and combines the functions of stabilization and welding. In this variation, the booster is eliminated and the horn is secured in the press in the position of the booster mounting ring area.

As the frequency increases, the vibration amplitude decreases. Higher frequencies are used for seaming of thin materials and delicate parts that do not require a lot of amplitude. Since the horn becomes smaller at higher frequencies, closer spacing can also be achieved.

Plastic welding is the most common application of ultrasonic assembly. To perform ultrasonic plastic welding, the tip of the horn is brought into contact with the upper workpiece W1, as shown in FIG. 5. Pressure is applied and ultrasonic energy travels through the upper workpiece, increasing the kinetic energy (or heat) at the contact point of the two workpieces. The heat melts a molded ridge of plastic on one of the workpieces, and the molten material flows between the two surfaces. When the vibration stops, the material solidifies forming a permanent bond.

The linear actuator 11 comprises an electric servo motor 30 integrated with a converter 31 that converts the rotating output of the motor 30 into linear motion. The converter is typically a lead screw coupled to the motor output shaft 30a, with a follower unit traveling along the threads of the lead screw to produce the desired linear output. In the illustrative embodiment, the linear output is controlled vertical movement of a rod 31a that connects the converter 31 to the stack 10. The integrated unit that contains both the servo motor 30 and the converter 31 is a commercially available item, such as the GSM or GSX Series linear actuators available from Exlar Corporation of Chanhassen, Minn. See also U.S. Pat. No. 5,557,154 assigned to Exlar Corporation. The linear position feedback used by the servo motor can be provided by a linear encoder coupled to the weld stack 10, or by a rotary encoder which senses the position of the rotating motor 30.

Figure 4:
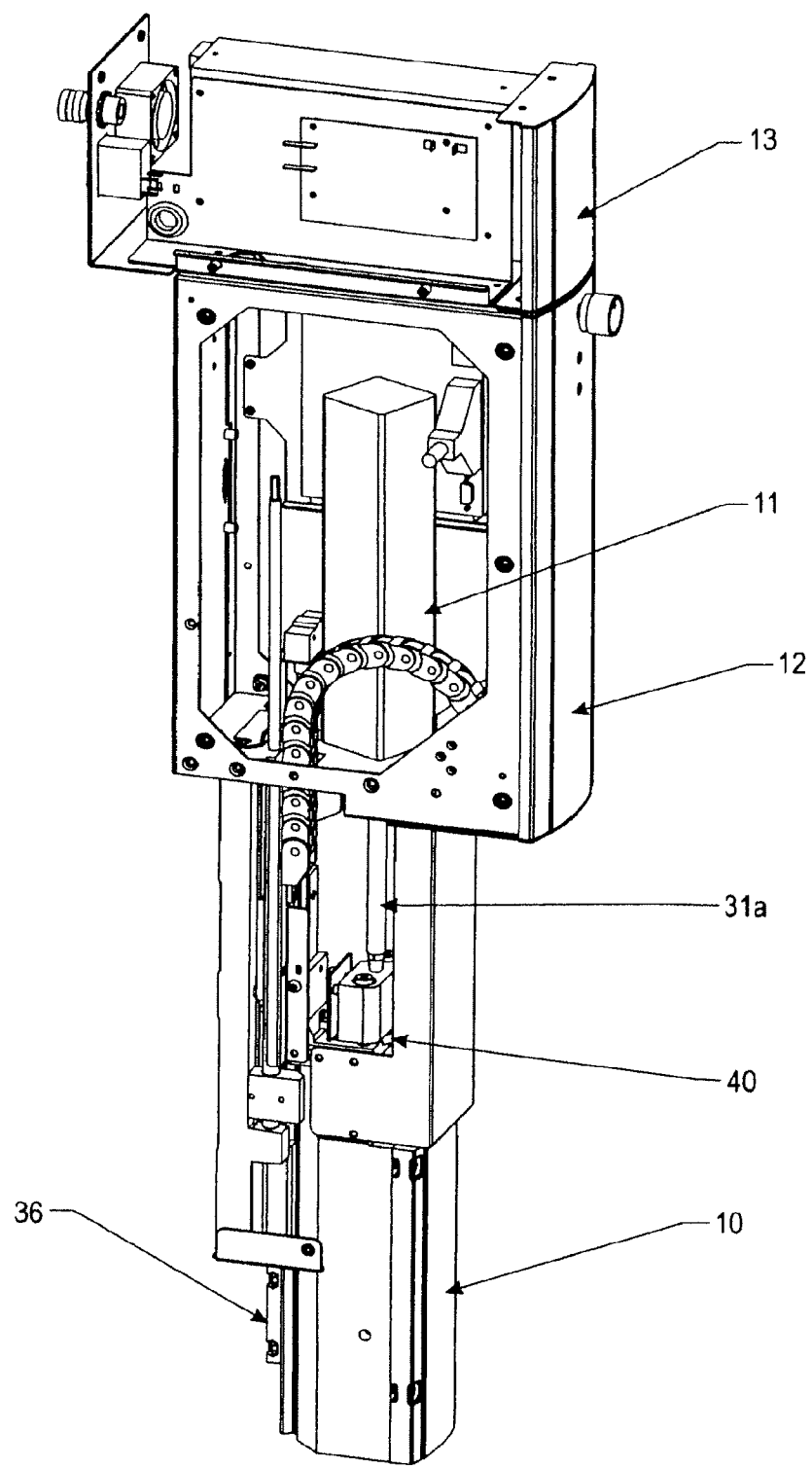
FIG. 4 is a variation of FIG. 2 showing a load cell used for force feedback.

As can be seen in FIGS. 2 and 4, the actuator rod 31a moves linearly along a vertical axis. The lower end of the rod 31a is connected to the components comprising the carriage to which the ultrasonic welding stack 10 is attached. The purpose of the actuator 11 is to apply a controlled force, speed, or a combination of force and speed to the stack 10 to press the stack downwardly against the workpiece W1 while the stack is also transmitting mechanical vibrations to the workpiece. The linear movement of the rod 31a is another controllable variable. For example, the linear movement of the rod 31a may be controlled so as to control a weld depth, especially after the thermoplastic material of the workpieces has been softened sufficiently to effect the desired weld. Excessive advancement of the rod 31a after the thermoplastic material has been softened by the applied vibrating energy can produce a weld that is too thin and, therefore, too weak. Likewise, in accord with concepts disclosed below, an initial linear movement of the rod 31a may be delayed, such as by being held at or near zero, until after a softening of the thermoplastic material of the workpieces causes a reduction in an initially applied force to a level below a predetermined threshold.

Figure 3:
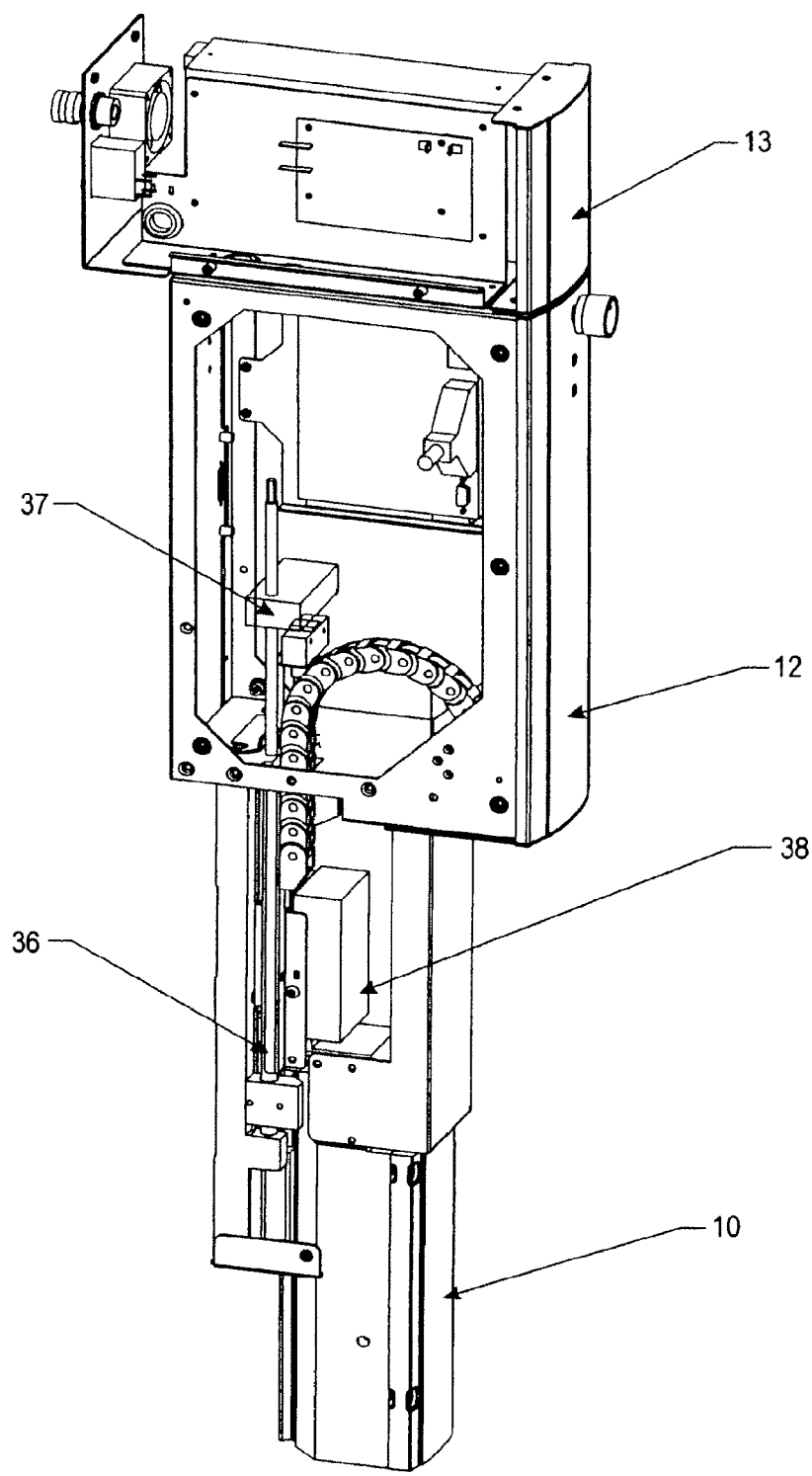
FIG. 3 is a variation of FIG. 2 showing a linear motor drive in place of the servo-motor driven actuator.

An alternative method of driving the welding stack is shown in FIG. 3 by the use of a direct drive linear servo slide. These slides reduce inaccuracies caused by gear backlash and power screw wrap up. A direct drive linear servo motor 38 acts on the stack assembly 10. This linear drive servo motor is a combination of the motor 30 and the converter 31. Such drives are commercially available from a number of suppliers such as the Parker Trilogy 410 Series. The position feedback 36 is provided directly by the linear motor, e.g., using an encoder or resolver coupled directly to the motor shaft. In order to use a linear servomotor in a vertical configuration, a separate, electric brake 37 is required to keep the welding stack 10 from falling under its own weight during power off conditions.

Figure 7:
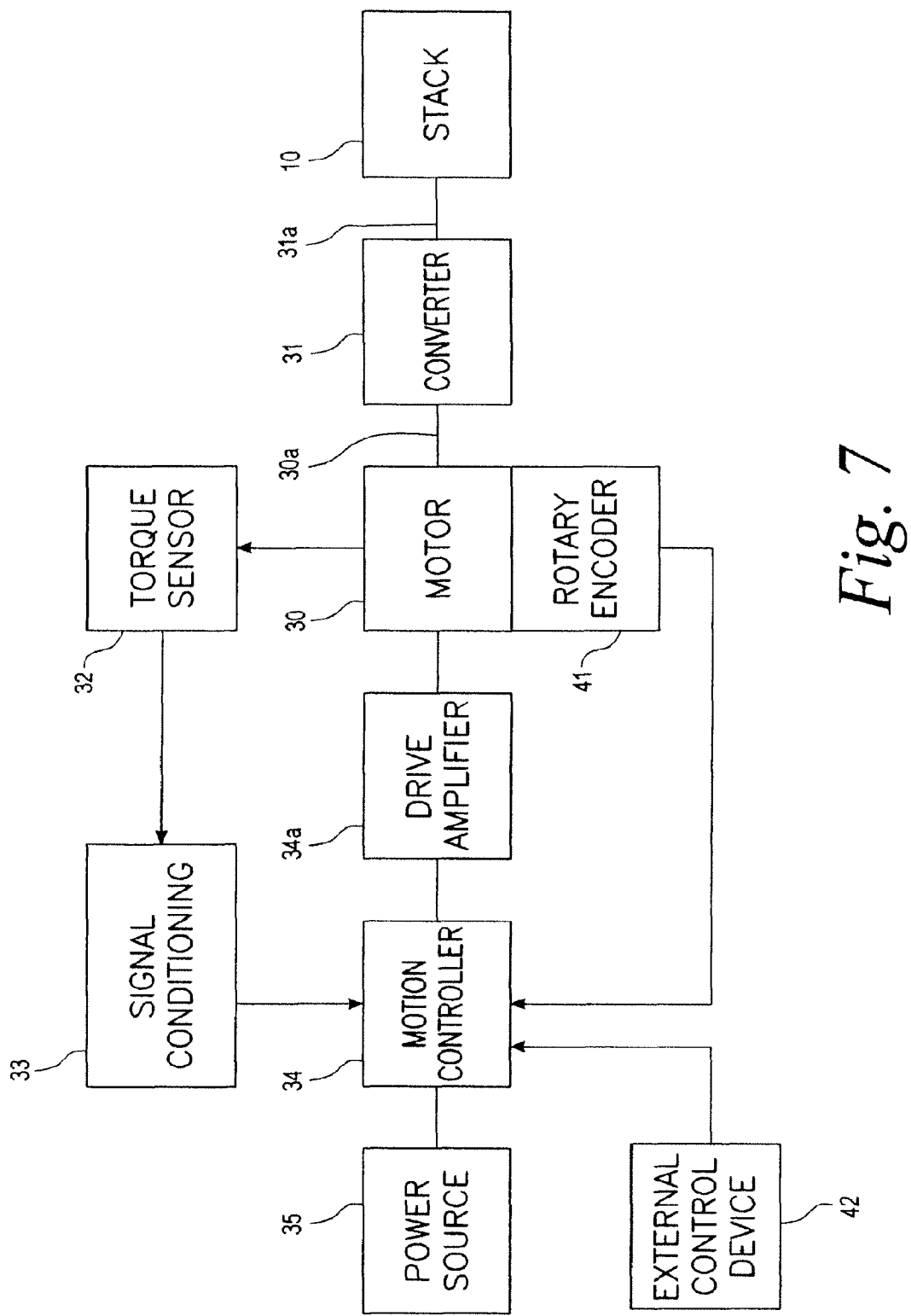
FIG. 7 is a block diagram of one embodiment of a control system for the linear actuator used in the ultrasonic welding machine shown in FIGS. 1-3.

FIG. 7 illustrates a control system for the linear actuator 11. A force control loop includes a torque sensor 32 coupled to the rotary output shaft 30a of the electrical servo motor 30, for producing an electrical signal related to the magnitude of the torque output of the motor 30. This torque signal is processed in conventional signal conditioning circuitry 33 and then supplied to a motion controller 34 that receives power from a power source 35 and controls the electrical current supplied to the motor 30 via drive amplifier 34a. Thus, the torque sensor 32 and the signal conditioning circuitry 33 form a feedback loop that controls the motor 30 to turn the output shaft 30a with a desired torque, which in turn controls the force applied to the stack 10 by the converter 31 that converts the rotary output of the motor 30 to linear motion of the rod 31a. This feedback loop makes it possible to control the pressure applied to the workpieces during the welding operation by controlling the output torque produced by the servo motor.

Figure 8:
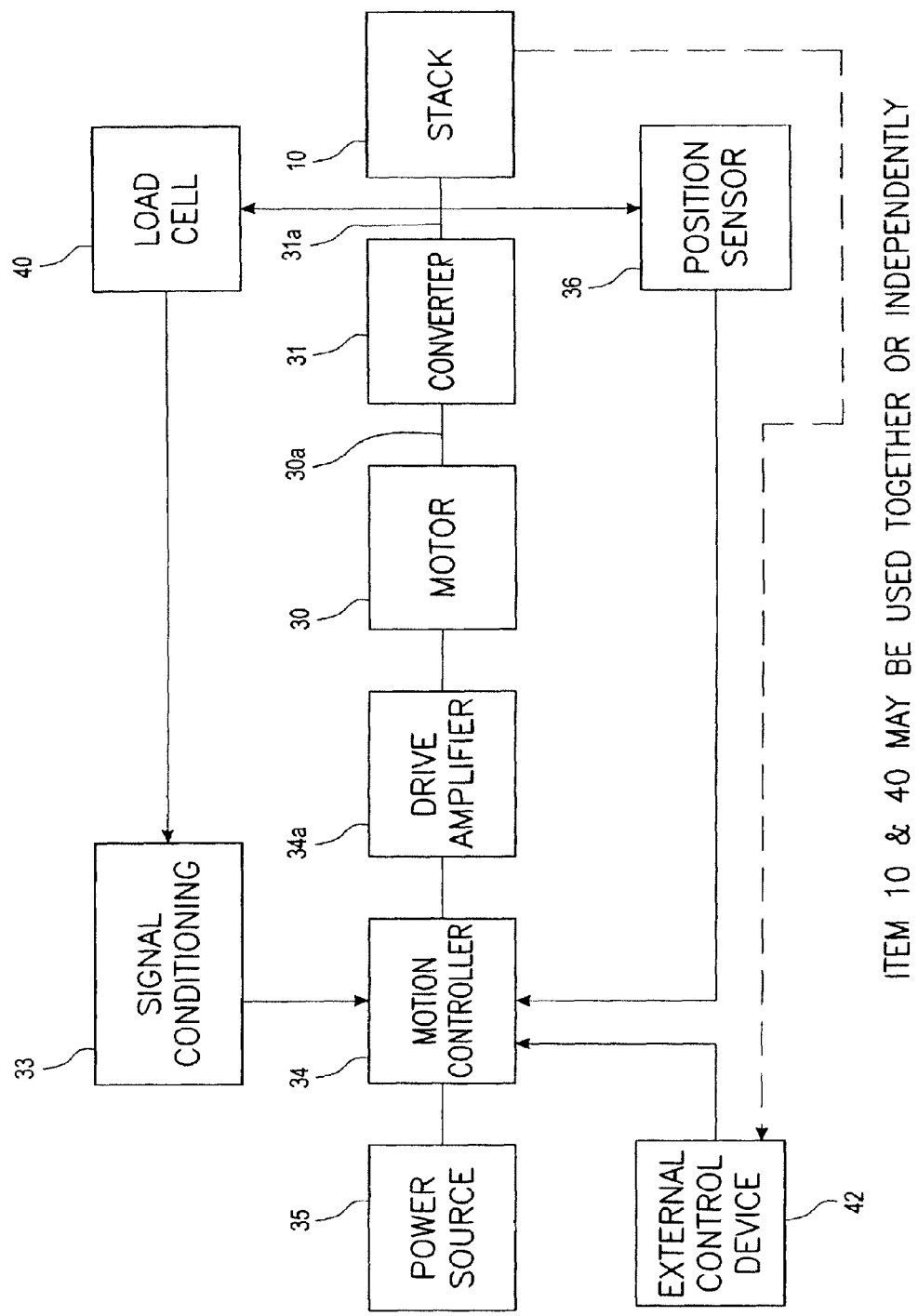
FIG. 8 is a block diagram of one embodiment of a control system for the linear actuator used in the ultrasonic welding machine shown in FIG. 4.

An alternate method of providing force feedback to the control system uses a commercially available load cell in place of torque control on the motor drive itself. The load cell 40 is positioned so that it can measure the force exerted by the welding stack upon the workpiece. This is illustrated in FIGS. 4 and 8.

To control the magnitude of the linear displacement of the rod 31a, a position sensor 36 is coupled to the rod 31a, for producing an electrical signal related to the vertical movement of the rod 31a. For example, the position sensor 36 may be an encoder that produces a number of electrical pulses proportional to the magnitude of the displacement of the rod 31a. This position signal is supplied to the controller 34 as a further parameter for use by the controller 34 in controlling the electrical current supplied to the motor 30. Thus, the position sensor 36 is part of a feedback loop that controls the motor 30 to control the angular displacement of the output shaft 30a, which in turn controls the magnitude of the vertical movement of the rod 31a, and thus of the stack 10. The actual displacement of the stack 10 is, of course, a function of both the force applied by the motor 30 and the resistance offered by the workpieces, which varies as the weld zone is heated and softens the thermoplastic material of the workpieces.

An alternate method of determining the linear position of the welding stack during the welding cycle is by utilizing the encoder feedback of the motor. This is represented by item 41 in FIG. 7 or item 36 in FIG. 8. This position is a function of motor position and the drive screw nut lead in combination with any gear reduction used in the drivetrain.

In addition to controlling the force, speed, or combination of force and speed directly, the motion control system 34 is capable of automatically changing the force or speed on-the-fly based on an arbitrary algorithm using an input signal or combination of signals from an external control device 42. The external control device 42 may be the ultrasonic generator or controller which provides power and control to the stack 10. It may be a controller which is connected to or involved with the workpieces W1 and W2. In these instances the motion controller 34 receives the input signal(s) from an external device 42, signal conditioner 33, and position sensor 36 and generates the force or speed changes during the welding and holding processes. For example, the actuator can be commanded to automatically change force or speed in an effort to maintain ultrasound power output (provided by ultrasonic generator) constant. As a second example, the ultrasonic transducer 20 may provide feedback power to an external control device 42 related to the force being exerted upon it. This feedback power will be used as a basis for the external control device to influence the motion controller 34 to change the force or speed of the motor and actuator 30 and 31. The result will be a closed servo-control loop relating the force applied to the workpiece W1 and W2 and the actual welding speed as reported by either or both of the position sensors 36 and 41.

There are numerous advantages of using servo-electric control in a welding system of this type. The primary advantage is the capability to precisely control the position of the welding stack throughout the weld process due to the repeatable and controllable nature of electrical power compared with pneumatic systems, which are subject to inaccuracies due to media compressibility. A second advantage is the ability to change the speed or force of the weld stack faster from one level to another using a servo system. A third advantage is the increased ease of calibration and verification of a welding system using an electric servo due to absence of all pneumatic controls, which also reduces the effort involved in setting up multiple welding systems to achieve matching performance.

It is also possible to combine the effects of the speed and force feedback to control the weld process. An example of this is monitoring and varying the speed as a secondary control in order to hold a constant force exerted by the servo motor on the part. In this scenario a maximum and minimum welding speed can be defined to ensure that all parts have a well defined envelope of process parameters. The reciprocal method of varying the force exerted by the servo motor within defined limits to maintain a predetermined velocity profile is also viable with this apparatus and the control capabilities inherent in the design. As one example, the ultrasonic welding method includes at least one input signal to adjust the force or speed of the linear actuator responsive to a measured power (e.g., an instantaneous power) delivered to the transducer 20. In another example, the ultrasonic welding method includes at least one input signal to adjust the force or speed of the linear actuator responsive to a cumulative power delivered to the transducer 20 (i.e., the power delivered to the transducer is continually summed over time to yield the cumulative power, and this cumulative power may be used as the reference in a feedback loop).

Figure 9:
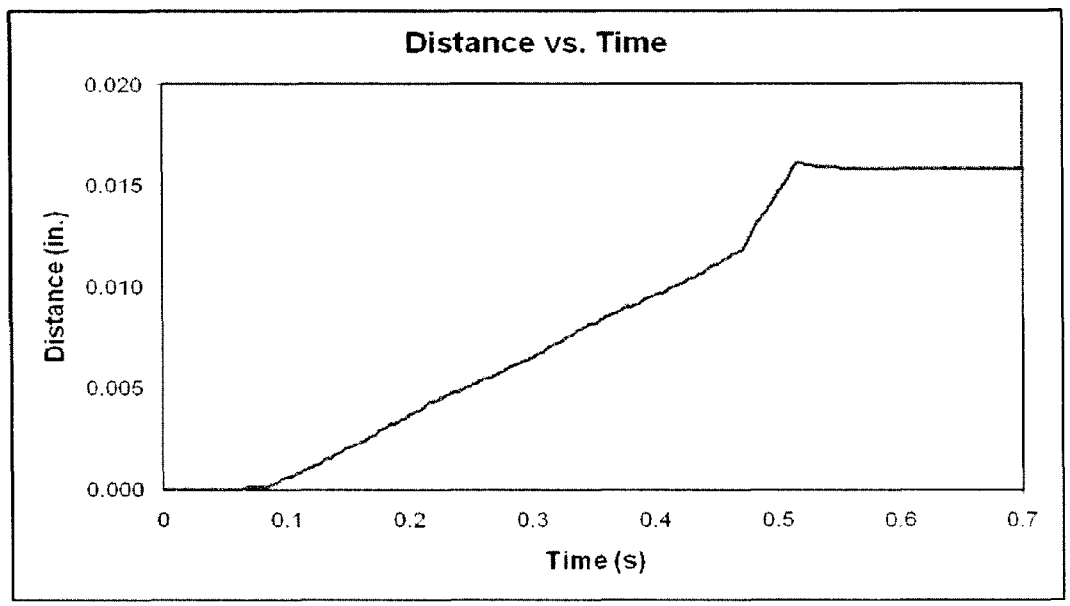
FIG. 9 shows a distance versus time graph for a weld sample formed using a servo press and employing a delayed motion technique in accord with at least one aspect of the present concepts.
Figure 10:
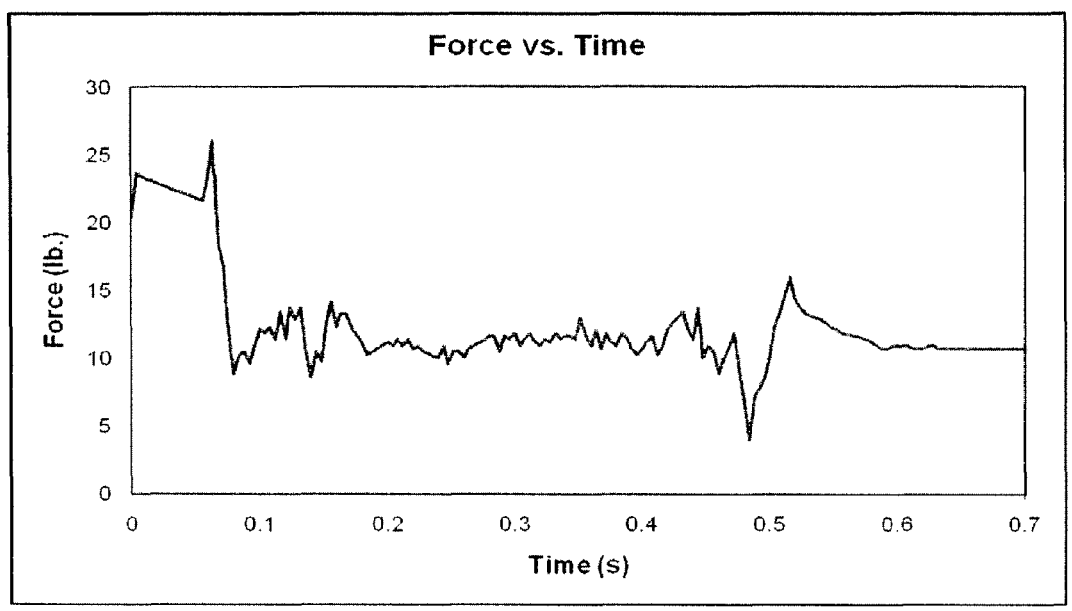
FIG. 10 shows a force versus time graph for the weld in the sample noted in FIG. 9.
Figure 11:
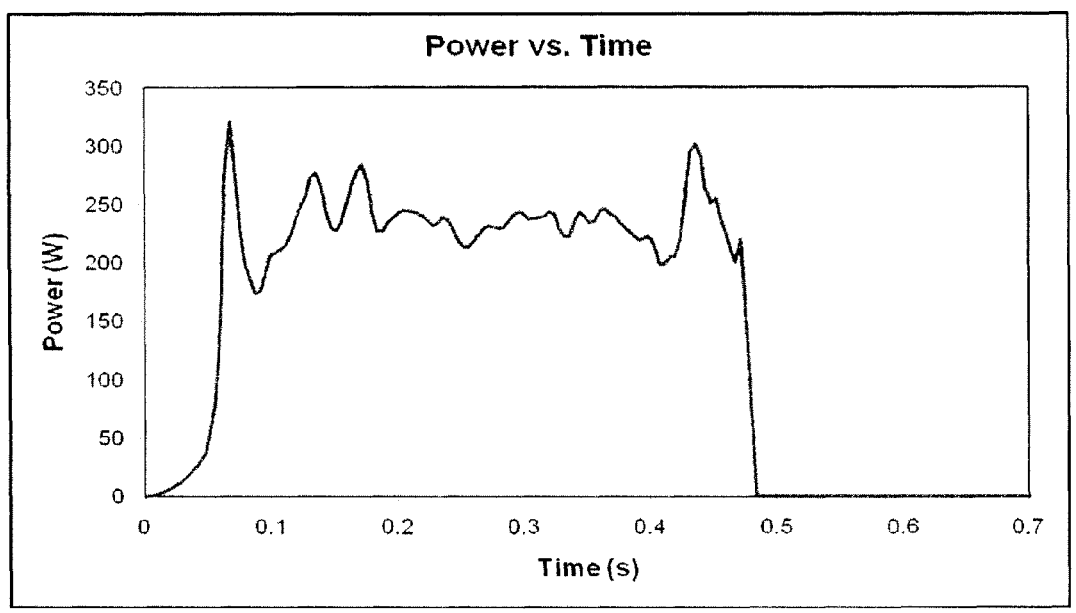
FIG. 11 shows a power versus time graph for the power output to the transducer of the weld stack for the weld in the sample noted in FIG. 9.

FIG. 9 shows a distance versus time graph for a polycarbonate weld sample formed using a servo press system and employing a delayed motion technique in accord with at least one aspect of the present concepts. FIG. 10 shows a force versus time graph for the weld in the sample noted in FIG. 9. FIG. 11 shows a power versus time graph for the power output to the transducer of the weld stack for the weld in the sample noted in FIG. 9. In this depicted experimental weld sample, a feature was implemented wherein, after an initial load ("trigger force") of 20 pounds was applied to the ultrasonic stack, the displacement of the ultrasonic weld stack 10 was held substantially at zero. It bears noting that the initial load is a variable load that is selectable by an operator or, alternatively by the control system upon input of appropriate welding parameters and process information, and may vary between zero pounds and any upper limit of the linear actuator utilized. After this initial load was applied, the welding operation was initiated at a time of 0 seconds by powering the transducer 20 of the ultrasonic welding stack 10. At that time, the weld collapse distance was 0 inches. Through the time of about 0.080 seconds, the weld distance was maintained substantially at 0 inches.

During this time, the ultrasonic weld stack 10 power increased and the welding operation began to soften the thermoplastic material of the workpiece at the welding point. Correspondingly, a drop in force (FIG. 10) starting at a time of about 0.064 seconds is observed. At this time, the power to the transducer 20 is about 275 W (see FIG. 11). Between about 0.064 seconds and about 0.080 seconds, the force applied by the linear actuator 11 on the ultrasonic weld stack 10 is observed to drop from about 26 pounds to about 9 pounds. Up until this time, the weld distance is maintained near zero and the linear actuator rod 31a and ultrasonic weld stack 10 are not appreciably advanced. However, following the observed decrease in force past a selected predetermined threshold force, which was about 17 pounds in the present example, the control system initiated downward motion of the weld stack (e.g., a positive downward velocity) to continue the weld process in accord with a selected weld process profile, as indicated by the parameters in FIGS. 9-11.

The weld sample produced by the weld process depicted in FIGS. 9-11 was measured, yielding a collapse height (e.g. difference between unwelded and welded parts) of 0.0174 inches, and subsequently pull tested, yielding an ultimate pull strength of 1006 pounds. In testing of the concepts described herein, a statistically significant number of samples were welded under similar conditions (i.e., implementing a delayed motion technique as described herein) and yielded an average collapse height of 0.0172 inches with a standard deviation of 0.0001 inches, and pull strength of 991 pounds with a standard deviation of 19 pounds. Comparison tests were performed on another group of the same weld samples using a pneumatic system with the same ultrasonic weld horn and generator. In the pneumatic tests, the ultrasonic weld stack was operated in a "force" mode wherein a specified weld force is maintained by controlling air pressure to achieve a fairly constant weld force throughout the weld. By comparison, a statistically significant number of samples produced by the pneumatic system weld process were measured, yielding an average collapse height of 0.0179 inches with a standard deviation of 0.0016 inches, and pull tested, yielding an average pull strength of 1002 pounds, with a standard deviation of about 31 pounds.

The results of the servo tests implementing the delayed motion technique were superior to those of the pneumatic tests for consistency of collapse distance and pull strength repeatability. In addition, although the absolute average value of the pull strength was slightly higher with the pneumatic system, the average weld collapse distance was also slightly higher. Since these samples employed a shear weld joint design familiar to those skilled in the art, the average pull strengths per unit of weld collapse distance can be compared. The samples welded on the servo system yielded a higher relative strength compared to the samples welded on the pneumatic system. The average values were 57,700 and 56,000 pounds per inch of weld collapse, respectively.

It is expected that still further improvements to weld strength may be obtained by adjusting the amount of the delay before initiating a downward motion of the ultrasonic welding stack 10 as well as by adjusting the velocity profile throughout the remainder of the weld. Improvements to strength repeatability can also be expected by enhancing the accuracy and repeatability of force sensing employed in this technique, which can be achieved by further reducing electrical and mechanical noise in the sensing circuitry.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. As one example, although the weld distance of the ultrasonic welding stack has been described herein in the delayed motion phase of the welding operation to be maintained at or near zero, a slight slope or an arbitrary profile may be advantageously used.

As another example, in accord with at least some aspects of the present concepts, it is possible that the described actuator and associated control system could be implemented in combination with the second workpiece W2 such that the actuator moves the second workpiece W2 toward the stationary workpiece W1 attached to or adjacent a stationary welding stack (i.e., stationary except for the vibratory movement of the horn 22). The control systems described herein then control a linear movement of the second workpiece W2 against the first workpiece W1 by applying a controlled force, speed, or a combination of force and speed to the second workpiece with the electrically powered linear actuator to the second workpiece against the first workpiece to which the second workpiece is to be joined. Likewise, another potential application of the present concepts may include an arrangement wherein the second workpiece W2 is mounted adjacent the horn of the ultrasonic welding stack and the described actuator and associated control system implemented as previously described to bias the first workpiece W1 against the stationary workpiece W2 attached to or adjacent the stationary welding stack (i.e., stationary except for the vibratory movement of the horn 22). The control systems described herein then control a linear movement of the first workpiece W1 against the second workpiece W2. It is further to be understood that although forces may be shown to be applied in a particular manner herein, such as pressing against a stationary target workpiece from above, other variants of force application are included within the present concepts, such as, but not limited to, pulling a movable workpiece (e.g., W1) toward a stationary workpiece (e.g., W2) in like manner.

Similarly, the present concepts are not limited to ultrasonic welding, but may advantageously be incorporated into other welding processes and welding equipment utilizing a servo motor or actuator to drive workpieces such as, but not limited to, friction welding or diffusion welding.

What is claimed is:

1. An ultrasonic welding system comprising:
an ultrasonic welding stack movable, in response to control inputs, to initiate a welding operation by applying vibrational energy to a workpiece;
a plurality of sensors to measure respective control variables, the plurality of sensors outputting control signals corresponding, respectively, to the control variables; and
a motion control system coupled to and causing controlled movement of the ultrasonic welding stack, including the initiation of the welding operation, the motion control system
determining, based on the control signals received from the plurality of sensors, the control inputs such that any motion of the ultrasonic welding stack, subsequent to initiating the welding operation, is initially delayed until the control signals indicate that the control variables satisfy a predetermined condition associated with sensed parameters of the plurality of sensors, and
causing the ultrasonic welding stack to move, in response to the predetermined condition being satisfied, in accordance with a weld profile.

2. The ultrasonic welding system of claim 1, wherein the plurality of sensors includes a torque sensor and a force sensor, the predetermined condition consisting of both a specified torque and a specified force.

3. The ultrasonic welding system of claim 1, wherein the plurality of sensors include a torque sensor and an ultrasonic power sensor, the predetermined condition consisting of both a specified torque and a specified ultrasonic power.

4. The ultrasonic welding system of claim 1, wherein the plurality of sensors include a torque sensor and a cumulative power sensor, the predetermined condition consisting of both a specified torque and a specified cumulative ultrasonic power.

5. The ultrasonic welding system of claim 1, wherein the plurality of sensors includes an ultrasonic power sensor and a force sensor, the predetermined condition consisting of both a specified ultrasound power and a specified force.

6. The ultrasonic welding system of claim 1, wherein the plurality of sensors includes a cumulative ultrasonic power sensor and a force sensor, the predetermined condition consisting of both a specified cumulative ultrasonic power and a specified force.

7. The ultrasonic welding system of claim 1, wherein the motion control system automatically changes a force or speed of the ultrasonic welding stack based on the control signals.

8. The ultrasonic welding system of claim 7, wherein the changes of force or speed are responsive to maintain a constant ultrasonic power output.

9. The ultrasonic welding system of claim 7, wherein the changes of force or speed include one or more of (i) changes of force responsive to maintain a constant speed and (ii) changes of speed responsive to maintain a constant force.

10. A method for ultrasonic welding comprising:
initiating a welding operation by applying, via a movable ultrasonic welding stack, a vibrational energy to a workpiece;
measuring, via a plurality of sensors, control variables and outputting corresponding control signals;
based on the control signals, determining, via a motion control system, control inputs for movement of the ultrasonic welding stack;
subsequent to initiating the welding operation, delaying any motion of the ultrasonic welding stack until the control signals indicate that the control variables satisfy a predetermined condition associated with sensed parameters of the plurality sensors; and
in response to the predetermined condition being satisfied, causing movement of the ultrasonic welding stack in accordance with a weld profile.

11. The method of claim 10, further comprising sensing a specified torque, via a torque sensor, and a specified force, via a force sensor, the predetermined condition consisting of the specified torque and the specified force.

12. The method of claim 10, further comprising sensing a specified torque, via a torque sensor, and a specified ultrasonic power, via ultrasonic power sensor, the predetermined condition consisting of the specified torque and the specified ultrasonic power.

13. The method of claim 10, further comprising sensing a specified ultrasonic power, via a ultrasonic power sensor, and a specified force, via a force sensor, the predetermined condition consisting of the specified ultrasonic power and the specified force.

14. The method of claim 10, further comprising automatically changing, via the motion control system, a force or speed of the ultrasonic welding stack based on the control signals.

15. The method of claim 14, further comprising maintaining, via the motion control system, a constant ultrasonic power output.

16. The method of claim 14, further comprising maintaining, via the motion control system, one or more of (i) a constant speed in response to changes of force and (ii) a constant force in response to changes of speed.

* * * * *

UNITED STATES PATENT AND TRADEMARK OFFICE
CERTIFICATE OF CORRECTION

PATENT NO. : 9,849,627 B2
APPLICATION NO. : 14/209273
DATED : December 26, 2017
INVENTOR(S) : Leo Klinstein et al.

Page 1 of 1

It is certified that error appears in the above-identified patent and that said Letters Patent is hereby corrected as shown below:

In the Claims

At Column 9, approx. Line 65 (Claim 4, Line 2), please insert --ultrasonic-- after "cumulative".

At Column 10, Line 36 (Claim 10, Line 14), please delete "plurality sensors" and insert --plurality of sensors-- therefor.

Signed and Sealed this
Seventeenth Day of April, 2018

Andrei Iancu
*Director of the United States Patent and Trademark Office*